US008684044B2

(12) United States Patent  
Saiki et al.

(10) Patent No.: US 8,684,044 B2
(45) Date of Patent: Apr. 1, 2014

(54) FLUID CHARGING SYSTEM, MOVABLE OBJECT, SUPPLY FACILITY, AND METHOD FOR CONTROLLING FLUID CHARGE

(75) Inventors: Takashi Saiki, Okazaki (JP); Ryusuke Ishikawa, Kariya (JP); Makoto Kawatsu, Hekinan (JP)

(73) Assignee: Denso Corporation, Kariya (JP)

( * ) Notice: Subject to any disclaimer, the term of this patent is extended or adjusted under 35 U.S.C. 154(b) by 531 days.

(21) Appl. No.: 12/662,000

(22) Filed: Mar. 26, 2010

(65) Prior Publication Data

US 2010/0276031 A1 Nov. 4, 2010

(30) Foreign Application Priority Data

Mar. 31, 2009 (JP) .................................. 2009-087684

(51) Int. Cl.
*B65B 31/00* (2006.01)
(52) U.S. Cl.
USPC .................................. 141/4; 141/95; 141/197
(58) Field of Classification Search
USPC ............................. 141/1, 4, 94, 95, 197, 198
See application file for complete search history.

(56) References Cited

U.S. PATENT DOCUMENTS

| 5,857,501 A * | 1/1999 | Kelerich et al. ................. 141/94 |
| 6,422,465 B2 * | 7/2002 | Miller ........................... 235/384 |
| 6,598,624 B2 * | 7/2003 | Togasawa et al. ................ 141/1 |
| 6,648,032 B1 * | 11/2003 | Kelrich et al. .................. 141/94 |
| 7,412,994 B2 * | 8/2008 | Corless et al. ................. 141/198 |
| 7,896,036 B2 * | 3/2011 | Kobayashi et al. .............. 141/94 |
| 2002/0014277 A1 | 2/2002 | Togasawa et al. |
| 2002/0053365 A1 * | 5/2002 | Mutter .............................. 141/4 |
| 2008/0035235 A1 * | 2/2008 | Kobayashi et al. .............. 141/94 |

FOREIGN PATENT DOCUMENTS

JP 2005-69326 3/2005

OTHER PUBLICATIONS

U.S. Appl. No. 12/798,230, Ishikawa et al.

* cited by examiner

*Primary Examiner* — Jason K Niesz
(74) *Attorney, Agent, or Firm* — Harness, Dickey & Pierce, PLC (57) ABSTRACT

A supply facility is configured to charge fluid to a tank of a movable object. A charging profile storage unit is provided to the movable object to store a charging profile specifying a charging pressure of fluid in each elapsed time point from a beginning of fluid charge. A charging profile transmission unit is provided to the movable object to transmit the charging profile to the supply facility. A charging profile reception unit is provided to the supply facility to receive a charging profile transmitted from the charging profile transmission unit. A charging pressure control unit is provided to the supply facility to control charging pressure of fluid according to the charging profile when fluid is charged to a movable object, which corresponds to the charging profile.

3 Claims, 5 Drawing Sheets

FLUID CHARGING SYSTEM, MOVABLE OBJECT, SUPPLY FACILITY, AND METHOD FOR CONTROLLING FLUID CHARGE

CROSS REFERENCE TO RELATED APPLICATIONS

This application is based on and incorporates herein by reference Japanese Patent Applications No. 2009-87684 filed on Mar. 31, 2009.

FIELD OF THE INVENTION

The present invention relates to a fluid charging system configured to charge fluid such as hydrogen to a movable object such as a vehicle. The present invention further relates to a movable object and a supply facility related to the fluid charging system. The present invention further relates to a method for controlling fluid charge.

BACKGROUND OF THE INVENTION

In recent years, a fuel cell vehicle (FCV) has been developed. The FCV has a fuel cell to cause a chemical reaction of hydrogen and oxygen so as to generate electric energy. The FCV consumes the generated electric energy to activate a motor to obtain driving force of the vehicle. The FCV is connected with a feed pipe in a hydrogen station, and a hydrogen tank of the FCV is supplied with hydrogen (fuel) through the feed pipe (see US Patent 20020014277, JPA-2001-355795). The following methods (1), (2) for charging hydrogen may be conceived.

(1) Charging of hydrogen while a charging pressure of hydrogen is maintained at a low pressure such that a temperature in a hydrogen tank does not increase.

(2) Setting of the charging pressure of hydrogen at a high pressure in the beginning of hydrogen charge. Monitoring of the temperature in the hydrogen tank during the hydrogen charge, and decreasing the charging pressure or temporarily stopping the hydrogen charge when the monitored temperature becomes high.

In the method (1), hydrogen charge takes long, since the charging pressure is low. In the method (2), hydrogen charge cannot be efficiently performed, since the charging pressure is controlled subsequent to detection of temperature change in the hydrogen tank.

SUMMARY OF THE INVENTION

In view of the foregoing and other problems, it is an object of the present invention to produce a fluid charging system configured to efficiently charge fluid such as hydrogen to a movable object such as an FCV. It is another object of the present invention to produce a movable object and a supply facility of the fluid charging system. It is another object of the present invention to produce a method for controlling fluid charge.

According to one aspect of the present invention, a fluid charging system for a movable object, which has a tank configured to be charged with fluid, and a supply facility configured to charge fluid to the tank, the fluid charging system comprises a charging profile storage unit provided to the movable object and configured to store a charging profile, which specifies a charging pressure of fluid in each elapsed time point from a beginning of fluid charge to the tank during the fluid charge. The fluid charging system further comprises a charging profile transmission unit provided to the movable object and configured to transmit the charging profile to the supply facility. The supply facility includes a charging profile reception unit configured to receive the charging profile transmitted from the charging profile transmission unit. The supply facility further includes a charging pressure control unit configured to control charging pressure of fluid according to the charging profile when fluid is charged to a specific movable object, which corresponds to the charging profile.

According to another aspect of the present invention, a method for controlling fluid charge, the method comprises transmitting a charging profile from a movable object to a supply facility, the charging profile specifying a charging pressure of fluid in each elapsed time point from a beginning of fluid charge when a tank of the movable object is charged with fluid from the supply facility. The method further comprises receiving the transmitted charging profile. The method further comprises controlling charging pressure of fluid according to the received charging profile when fluid is charged to a specific movable object, which corresponds to the charging profile.

BRIEF DESCRIPTION OF THE DRAWINGS

The above and other objects, features and advantages of the present invention will become more apparent from the following detailed description made with reference to the accompanying drawings. In the drawings.

DETAILED DESCRIPTION OF PREFERRED EMBODIMENTS

Embodiment

1. Overview of Fluid Charging System

Figure 1:
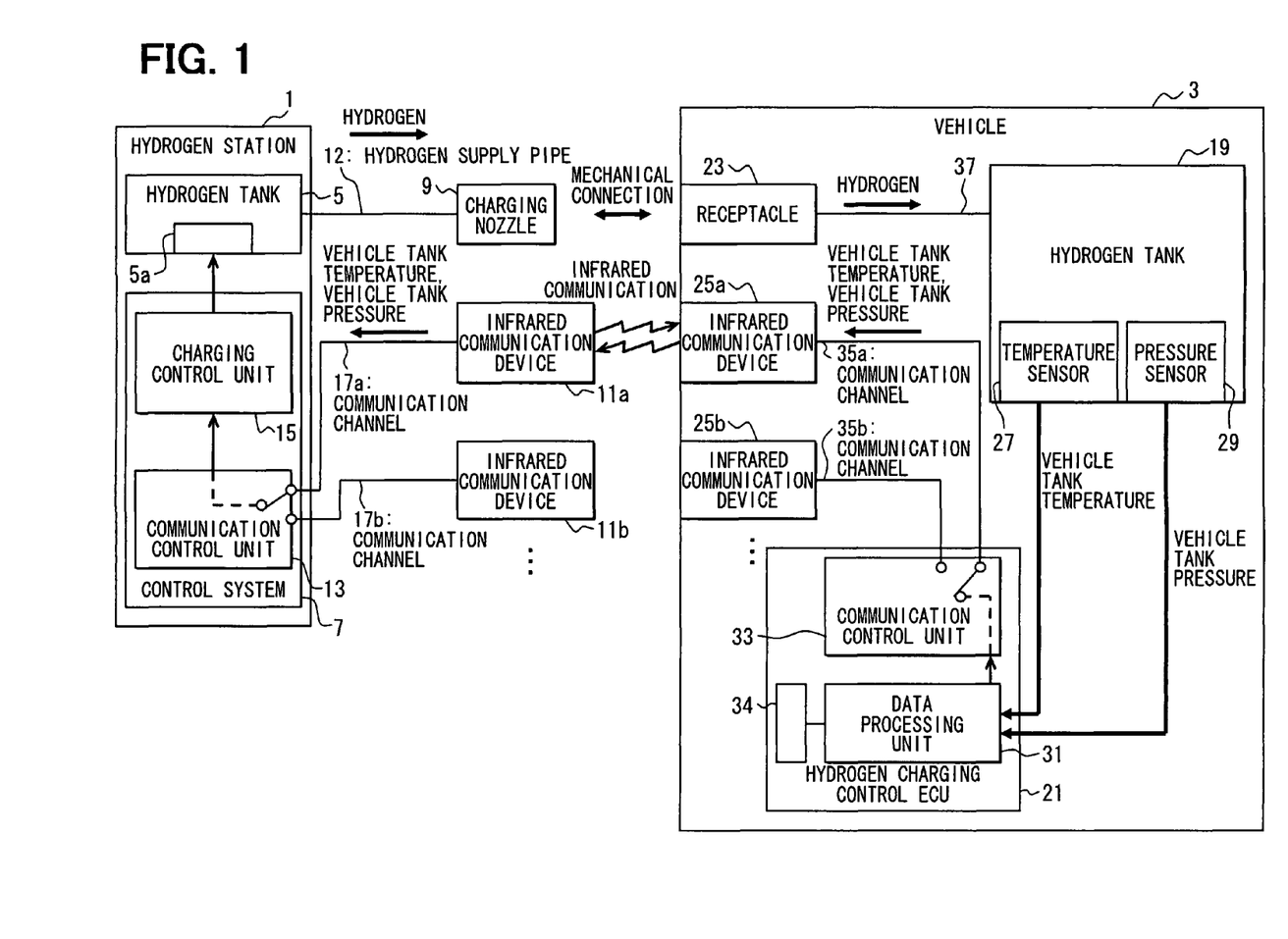
FIG. 1 is a block diagram showing a structure of a hydrogen station and a vehicle.

An overview structure of a hydrogen station (supply facility) 1 and a vehicle (movable object) 3 of a fluid charging system will be described with reference to FIG. 1. The hydrogen station 1 includes a hydrogen tank 5 for storing hydrogen (fluid), a control system 7 for controlling the hydrogen station 1, a charging nozzle 9, multiple infrared communication devices 11a, 11b, and the like. The number of the multiple infrared communication devices 11a, 11b may be two and may be a number greater than or equal to three, such as three, four, five, or six.

The hydrogen tank 5 includes a feed apparatus 5a for discharging hydrogen stored in the hydrogen tank 5 to the charging nozzle 9 through a hydrogen supply pipe 12. The control system 7 includes a communication control unit 13 and a charging control unit 15. The communication control unit 13 is respectively connected with the multiple infrared communication devices 11a, 11b, and the like via communication channels 17a, 17b and the like. The communication control unit 13 has a function to select one of the communication channels 17a, 17b, and the like used for an infrared communication. The function will be described later in detail. The multiple infrared communication devices 11a, 11b, and the like receive data such as a charging profile, a vehicle tank temperature, and a vehicle tank pressure. The communication control unit 13 outputs the data received by the multiple infrared communication devices 11a, 11b, and the like to the charging control unit 15. The charging control unit 15 has a function to determine a pressure (hydrogen charging pressure), when the feed apparatus 5a supplies hydrogen, based on the data inputted from the communication control unit 13. The charging control unit 15 further has a function to update the charging profile and transmit the updated charging profile to the vehicle 3 via the communication control unit 13 and the multiple infrared communication devices 11a, 11b, and the like. The present function will be described later in detail.

The vehicle 3 being a fuel cell vehicle (FCV) includes a hydrogen tank 19 for storing hydrogen, a hydrogen charging control ECU 21 for controlling a communication with the vehicle 3, a receptacle (connection port) 23, and multiple infrared communication devices 25a, 25b, and the like. The number of the multiple infrared communication devices 25a, 25b may be two and may be a number greater than or equal to three, such as three, four, five, or six. The hydrogen tank 19 includes a temperature sensor 27 for detecting its temperature (vehicle tank temperature) and a pressure sensor 29 for detecting its pressure (vehicle tank pressure). The hydrogen charging control ECU 21 includes a data processing unit 31, a communication control unit 33, and a storage unit 34. The data processing unit 31 periodically obtains the vehicle tank pressure from the pressure sensor 29 and the vehicle tank temperature from the temperature sensor 27. The data processing unit 31 outputs the obtained vehicle tank temperature and the obtained vehicle tank pressure to the communication control unit 33. The data processing unit 31 outputs the obtained vehicle tank temperature and the obtained vehicle tank pressure to the communication control unit 33. The data processing unit 31 further has a function to receive an updated charging profile transmitted from the hydrogen station 1 and store the received updated charging profile in the storage unit 34 when receiving the updated charging profile. The present function will be described later in detail.

The communication control unit 33 is connected with the multiple infrared communication devices 25a, 25b, and the like respectively via communication channels 35a, 35b and the like. The communication control unit 33 has a function to select one of the communication channels 35a, 35b, and the like used for the infrared communication. The function will be described later in detail. The communication control unit 33 is configured to transmit the vehicle tank temperature, the vehicle tank pressure, and the charging profile to the hydrogen station 1 via an infrared communication using the selected one of the communication channels 35a, 35b, and the like.

The storage unit 34 stores the charging profile. The charging profile is data, which specifies a hydrogen charging pressure of the feed apparatus 5a in each elapsed time point from the beginning of charging during the charging of hydrogen into the hydrogen tank 19. In particular, the charging profile is an optimal charging profile, which is determined to reduce a time period required for charging hydrogen as much as possible, while satisfying a condition to maintain the vehicle tank temperature to be less than a predetermined temperature. The optimal charging profile is affected by a feature of the hydrogen tank 19 such as the volume, the shape, the material, and the like. The optimal charging profile is determined for each vehicle 3, i.e., for each hydrogen tank 19.

The receptacle 23 is provided to the exterior of the body of the vehicle 3 and mechanically connectable with the charging nozzle 9. The receptacle 23 has an inner portion connectable with the hydrogen tank 19 through a hydrogen supply pipe 37. Hydrogen is supplied to the receptacle 23 through the charging nozzle 9, and the hydrogen is fed into the hydrogen tank 19 through the hydrogen supply pipe 37. The vehicle 3 further has a generally-known structure for functioning as a FCV.

2. Structure around the Charging Nozzle 9 and the Receptacle 23.

Subsequently, a structure around the charging nozzle 9 and the receptacle 23 will be described further in detail with reference to FIGS. 2A, 2B. The charging nozzle 9 is provided at a tip end of the hydrogen supply pipe 12. The charging nozzle 9 includes an inner pipe 39 and an outer pipe 41, which are coaxial with each other. The inner pipe 39 has a hollow space as a supply passage of hydrogen. The inner pipe 39 and the outer pipe 41 therebetween define a hollow space provided with the multiple infrared communication devices 11a, 11b, and the like. The multiple infrared communication devices 11a, 11b, and the like are arranged along the outer circumferential periphery of the inner pipe 39 at a regular interval, for example. The multiple infrared communication devices 11a, 11b, and the like are arranged in a direction to enable infrared communication along the axial direction of the charging nozzle 9 shown by the solid arrow in FIG. 2B. The inner pipe 39 has a projection 43 having a tip end projected beyond the outer pipe 41.

Figure 2A:
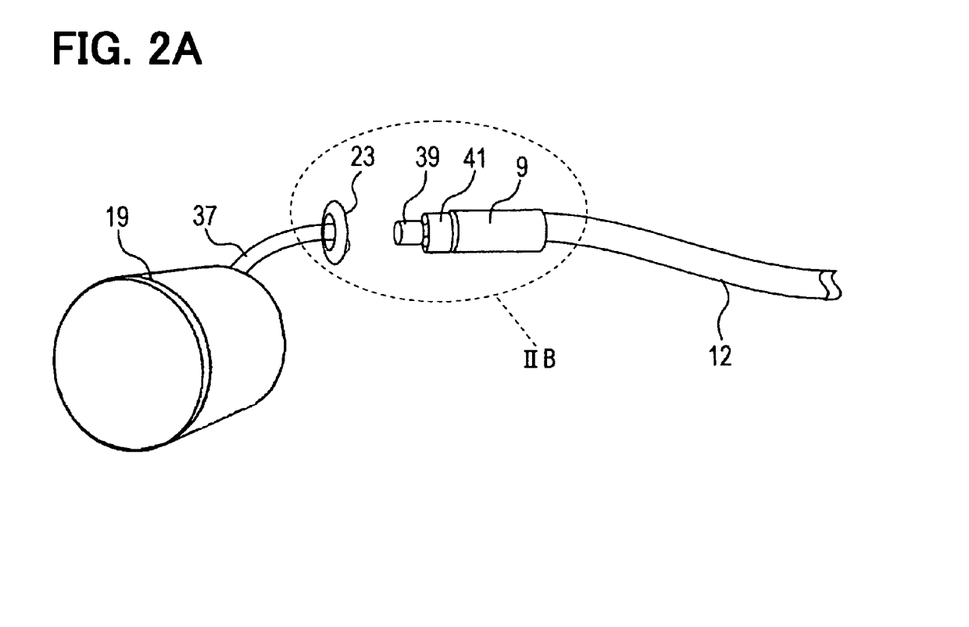
FIGS. 2A, 2B are schematic perspective views each showing a structure of a charging nozzle of the hydrogen station and a receptacle of the vehicle.
Figure 2B:
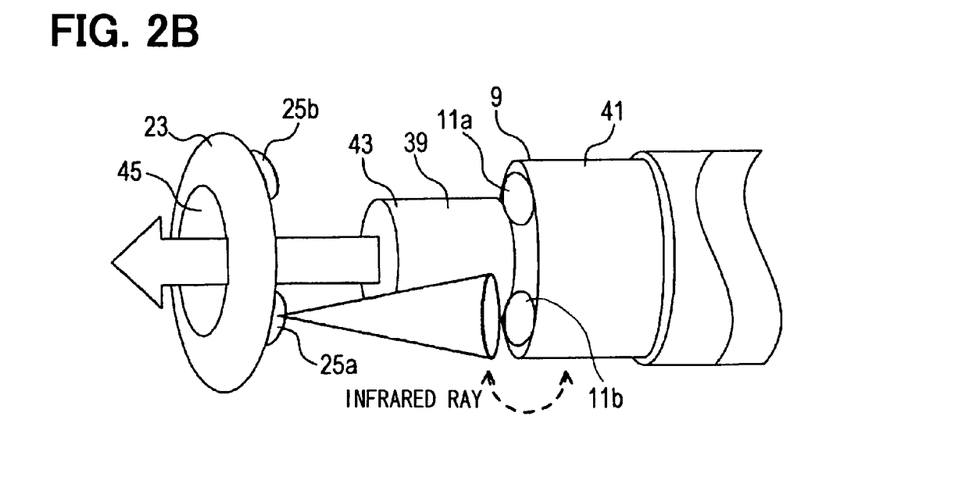

The multiple infrared communication devices 11a, 11b, and the like, which are configured to communicate with the communication channels 17a, 17b, and the like, are also accommodated in the hollow space between the inner pipe 39 and the outer pipe 41 (unillustrated in FIGS. 2A, 2B). Similarly to the charging nozzle 9, the hydrogen supply pipe 12 includes an inner pipe and an outer pipe. The inner pipe of the hydrogen supply pipe 12 defines a supply path of hydrogen. The communication channels 17a, 17b, and the like are accommodated in a hollow space between the inner pipe and the outer pipe.

The receptacle 23 is a doughnut-shape member having a circular hole 45 at the center. The diameter of the hole 45 is slightly greater than the outer diameter of the inner pipe 39 and smaller than the outer diameter of the outer pipe 41. Therefore, only the projection 43 of the inner pipe 39 can be inserted in the hole 45. The multiple infrared communication devices 25a, 25b, and the like are located on the lateral surface of the receptacle 23 and arranged along the hole 45. The multiple infrared communication devices 25a, 25b, and the like are arranged along the boundary of the hole 45 at a regular interval, for example. The multiple infrared communication devices 25a, 25b, and the like are arranged to enable infrared communication along a direction perpendicular to a main surface of the receptacle 23, i.e., in an opposite direction to the solid arrow in FIG. 2B.

The projection 43 of the charging nozzle 9 is inserted into the hole 45 of the receptacle 23 and mechanically connectable with the receptacle 23. The charging nozzle 9 can supply hydrogen to the receptacle 23 in this state. When the charging nozzle 9 is connected to the receptacle 23, as described above, the position of the charging nozzle 9 and the direction of the axis of the charging nozzle 9 are substantially uniquely determined, since the diameter of the hole 45 is slightly greater than the outer diameter of the projection 43. It is noted that, even when the charging nozzle 9 is connected with the receptacle 23, the charging nozzle 9 is rotatable in the direction shown by the dotted arrow around its axis in FIG. 2B. Thus, a rotation phase of the charging nozzle 9 is variable. When the charging nozzle 9 is connected to the receptacle 23 in this way, the section of the outer pipe 41, which accommodates the multiple infrared communication devices 11a, 11b, and the like at the side of its tip end, is opposed to a portion of the lateral surface of the receptacle 23, on which the multiple infrared communication devices 25a, 25b, and the like are located. The multiple infrared communication devices 11a, 11b, and the like and the multiple infrared communication devices 25a, 25b, and the like are arranged such that at least one of the multiple infrared communication devices 11a, 11b, and the like is opposed to either of the multiple infrared communication devices 25a, 25b, and the like to enable an infrared communication at any rotation phase of the charging nozzle 9.

For example, in the example shown in FIGS. 2A, 2B, the infrared communication device 11b and the infrared communication device 25a are in a physical relationship to enable an infrared communication therebetween. The charging nozzle 9 may be rotated from the present state. Consequently, an infrared communication between the infrared communication device 11b and the infrared communication device 25a may be disabled. Even in this condition, an infrared communication is certainly enabled in another combination between, for example, the infrared communication device 11a and the infrared communication device 25a. Each infrared communication device is configured to emit infrared ray in a constant spread range to have a specific communication range. Accordingly, each infrared communication device need not be exactly coaxial with an opposed infrared device to enable an infrared communication. Even when a communication range of each infrared communication device is narrow, an infrared communication can be enabled, regardless of the rotation phase of the charging nozzle 9, by increasing the number of the infrared communication devices to reduce the distance between adjacent infrared devices. On the contrary, when a communication range of each infrared communication device is wide, the number of the infrared communication devices may be small.

3 Control Method of Hydrogen Charging Pressure

Figure 3:
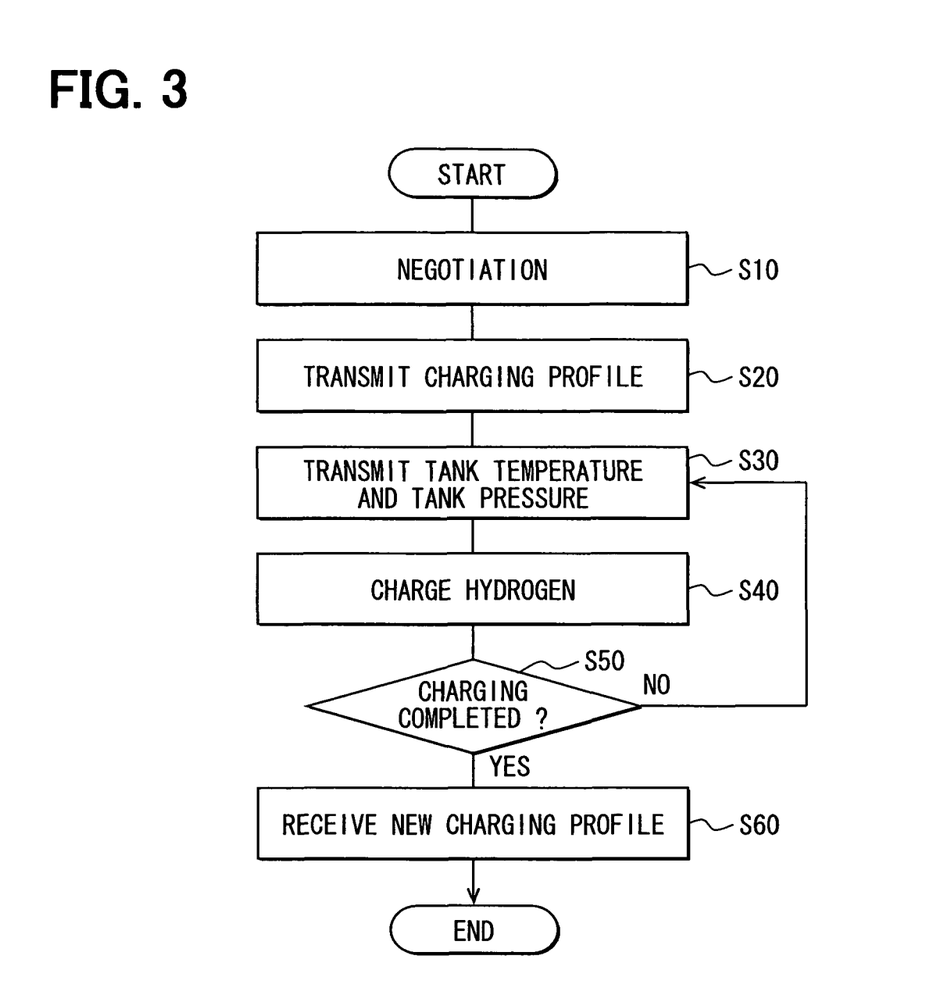
FIG. 3 is a flow chart showing an operation of the vehicle.
Figure 4:
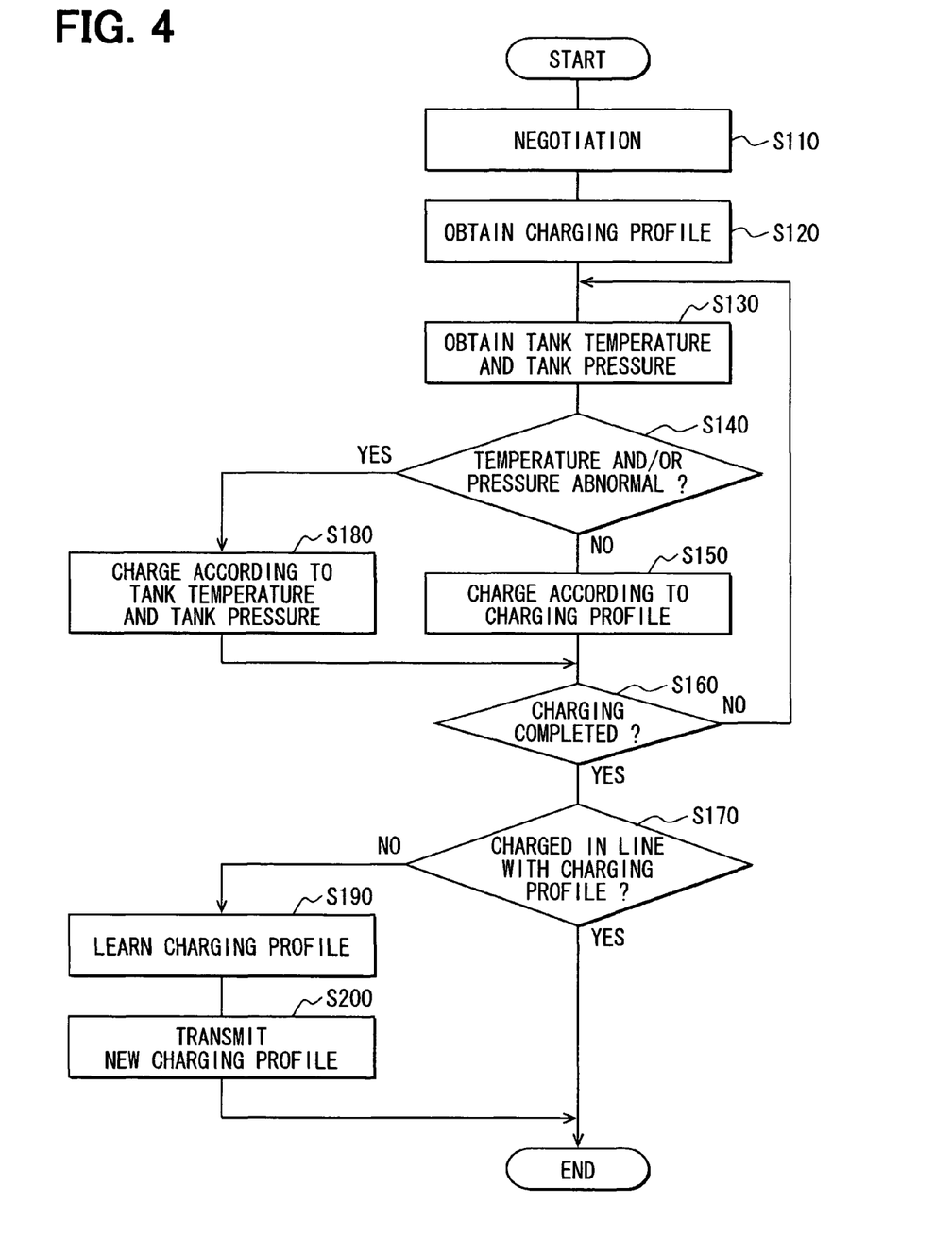
FIG. 4 is a flow chart showing an operation of the hydrogen station.

Subsequently, an operation for controlling a hydrogen charging pressure when the hydrogen station 1 charges hydrogen to the vehicle 3 will be described with reference to flow charts of FIGS. 3, 4. First, the operation at the side of the vehicle 3 will be described with reference to the flow chart of FIG. 3. At step S10, one of the multiple infrared communication devices 25a, 25b, and the like, which is in a position to be communicable via an infrared communication, is detected. Specifically, a negotiation with the one of the multiple infrared communication devices 25a, 25b is performed. That is, data (test data) for test is exchanged in a condition where only one of the multiple infrared communication devices 25a, 25b, and the like is activated (turned ON). The exchange of test data is repeated, while the one activated infrared communication device is switched. In the state shown in FIG. 1, only the communication channel 35a among the multiple communication channels 35a, 35b, and the like is connected with the communication control unit 33, and only the infrared communication device 25a among the multiple infrared communication devices 25a, 25b, and the like is activated (turned ON). Consequently, the infrared communication device, which can exchange the test data, is determined to be in a position in which the infrared communication device is communicable via an infrared communication. When two or more infrared communication devices can exchange the test data, the test (negotiation) is repeated to select one of the infrared communication devices, which has the highest number of successful exchanges of the test data.

At step S20, the charging profile is transmitted to the hydrogen station 1 via an infrared communication using the infrared communication device, which is determined to be in a position, in which the infrared communication device is communicable via an infrared communication, at step S10.

At step S30, the the vehicle tank temperature and the vehicle tank pressure are transmitted to the hydrogen station 1 via an infrared communication using the infrared communication device, which is determined to be in a position, in which the infrared communication device is communicable via an infrared communication, at step S10.

At step S40, hydrogen is supplied from the hydrogen station 1. In the present state, the hydrogen charging pressure is set to a value determined according to the charging profile, the vehicle tank temperature, and the vehicle tank pressure transmitted at steps S20, S30. The present function will be described later in detail.

At step S50, it is determined whether charging of hydrogen is completed. Specifically, charging of hydrogen is determined to be completed when the vehicle tank pressure reaches a predetermined value. At step S60, the updated charging profile is received from the hydrogen station 1 via an infrared communication and stored in the storage unit 34. When the storage unit 34 stores a previous charging profile before updating, the previous charging profile is overwritten by the presently updated charging profile. The updated charging profile is generated in the hydrogen station 1. The generation will be described later in detail.

Subsequently, the operation at the side of the hydrogen station 1 will be described with reference to the flow chart of FIG. 4. At step S110, the communication control unit 13 detects one of the multiple infrared communication devices 11a, 11b, and the like, which is in a position in which the one device is communicable via an infrared communication. Specifically, a negotiation with the one of the multiple infrared communication devices 11a, 11b is performed by the communication control unit 13. That is, data (test data) for test is exchanged by the communication control unit 13 in a condition where only one of the multiple infrared communication devices 11a, 11b, and the like is activated (turned ON). The exchange of test data is repeated, while the one activated infrared communication device is switched. In the state shown in FIG. 1, only the communication channel 17a among the multiple communication channels 17a, 17b, and the like is connected with the communication control unit 13, and only the infrared communication device 11a among the multiple infrared communication devices 11a, 11b, and the like is activated. Consequently, the infrared communication device, which can exchange the test data, is determined to be in a position in which the infrared communication device is communicable via an infrared communication. When two or more infrared communication devices can exchange the test data, the test (negotiation) is repeated to select one of the infrared communication devices, which has the highest number of successful exchanges of the test data.

At step S120, the infrared communication device, which is determined to be in the position and communicable via an infrared communication at step S110, receives the charging profile. The charging profile is transmitted from the vehicle 3 at step S20.

At step S130, the infrared communication device, which is determined to be in the position and communicable via an infrared communication at step S110, receives the vehicle tank temperature and the vehicle tank pressure. The vehicle tank temperature and the vehicle tank pressure are transmitted from the vehicle 3 at step S30.

At step S140, it is determined whether the vehicle tank temperature and/or the vehicle tank pressure received at step S130 is abnormal. Specifically, the charging control unit 15 stores a threshold for each of the vehicle tank temperature and the vehicle tank pressure for determining abnormality. When the vehicle tank temperature and/or the vehicle tank pressure received at step S130 is greater than the threshold(s), the vehicle tank temperature and/or the vehicle tank pressure is determined to be abnormal. When it is determined to be normal, the processing proceeds to step S150. Alternatively, when it is determined to be abnormal, the processing proceeds to step S180.

At step S150, hydrogen is charged to the vehicle 3 according to the charging profile received at step S120. That is, the hydrogen charging pressure during the charging of hydrogen to the vehicle 3 is set to be in line with the definition of the charging profile.

At step S160, it is determined whether charging of hydrogen is completed. Specifically, charging of hydrogen is determined to be completed when the vehicle tank pressure received at step S130 reaches a predetermined value.

At step S170, it is determined whether charging of hydrogen is performed in line with the charging profile. Specifically, it is determined whether abnormal temperature and/or abnormal pressure is detected in the process of charging of hydrogen to make a positive determination at step S140 and to cause the hydrogen charging pressure to differ from the charging profile during the charging of hydrogen at step S180. When the hydrogen charging pressure transitions along with the charging profile during the charging of hydrogen, the present processing is terminated. Otherwise, the present processing proceeds to step S190.

At step S140, when it is determined to be abnormal, the processing proceeds to step S180. At step S180, hydrogen is charged to the vehicle 3 according to the vehicle tank temperature and the vehicle tank pressure received at step S130. Specifically, the charging control unit 15 stores a data map defining a relationship among a hydrogen charging pressure, the vehicle tank temperature, and the vehicle tank pressure beforehand. The charging control unit 15 obtains the hydrogen charging pressure, which corresponds to the vehicle tank temperature and the vehicle tank pressure, from the data map and charges hydrogen according to the obtained hydrogen charging pressure.

When step S170 makes a negative determination, the processing proceeds to step S190, at which a charging profile learning operation is performed. Specifically, the charging control unit 15 updates the charging profile within a range, such that the vehicle tank temperature does not exceed a predetermined upper limit, so as to further reduce a time period required for charging of hydrogen. The charging control unit 15 stores a data map for calculating updated contents of the charging profile according to the vehicle tank temperature and the vehicle tank pressure received at step S130, and a previous charging profile before updating. The updated contents of the charging profile includes, for example, increasing or decreasing of the hydrogen charging pressure by a predetermined amount in a certain period. The charging control unit 15 updates the charging profile in line with the updated contents obtained from the data map.

At step S200, the charging profile updated at step S190 is transmitted to the vehicle 3 via an infrared communication using the infrared communication device, which is determined to be in a position, in which the infrared communication device is communicable via an infrared communication, at the step S110. The vehicle 3 receives the updated charging profile at step S60.

4. Operation Effect of Fluid Charging System

Figure 5A:
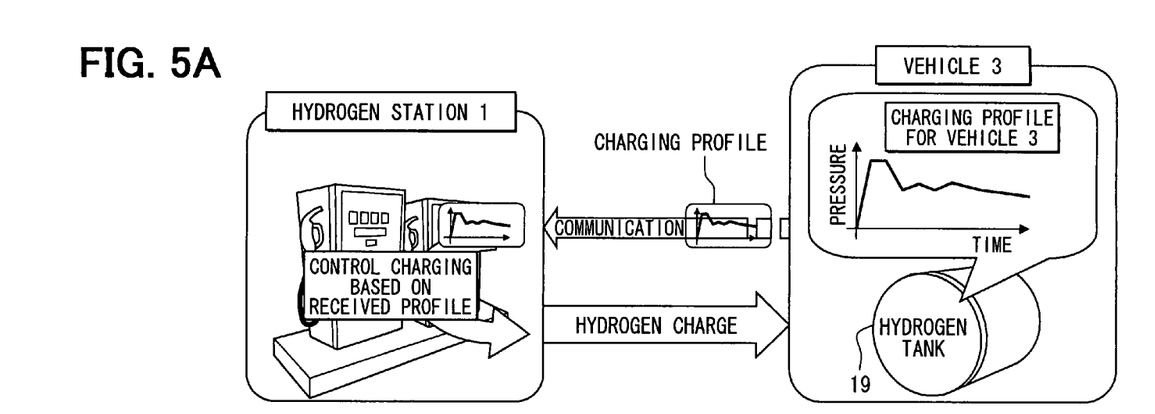
FIGS. 5A, 5B are explanatory diagrams each showing an operation effect of a fluid charging system related to the hydrogen station and the vehicle.

An operation effect of the fluid charging system according to the present embodiment will be described with reference to FIGS. 5A, 5B. As shown in FIG. 5A, in the fluid charging system according to the present embodiment, the vehicle 3 transmits a present charging profile, which is set to conform to the vehicle 3, to the hydrogen station 1 when the hydrogen station 1 charges hydrogen to the vehicle 3. The hydrogen station 1 controls a hydrogen charging pressure based on the present charging profile. Therefore, the hydrogen charging pressure is appropriately controllable according to a characteristic of the hydrogen tank 19 of the vehicle 3. Thus, the vehicle 3 can be efficiently and safely charged with hydrogen.

Figure 5B:
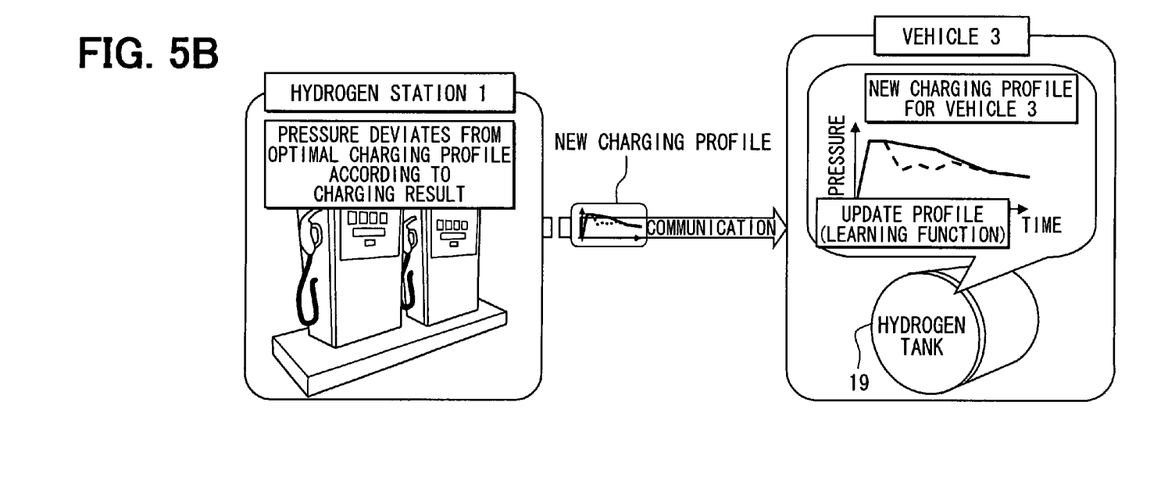

Further, in the fluid charging system according to the present embodiment, as shown in FIG. 5B, the hydrogen station 1 updates the charging profile when incapable of charging hydrogen in line with the charging profile received from the vehicle 3. That is, the hydrogen station 1 updates the charging profile when the charging profile is not an optimal charging profile. In this case, the hydrogen station 1 transmits the updated charging profile (new charging profile in FIG. 5B) to the vehicle 3. In this way, the charging profile can be further appropriately set, and hydrogen can be further efficiently and safely charged. In addition, even when the shape, the volume, the material, and the like of the hydrogen tank 19 are changed due to aging, the charging profile can be updated adaptively to the hydrogen tank 19.

The present invention is not limited to the above embodiment and may be practiced in various modes within a scope of the present invention. For example, in addition to the charging profile, a temperature profile may be stored in the storage unit 34 of the vehicle 3. The temperature profile specifies a temperature of the hydrogen tank 19 in each elapsed time point from the beginning of charging during the charging of hydrogen into the hydrogen tank 19. In this case, in addition to the charging profile, the vehicle 3 may transmit the temperature profile to the hydrogen station 1. Thus, the hydrogen station 1 may reduce the hydrogen charging pressure below a pressure value specified by the charging profile according to a comparison result between the vehicle tank temperature (actually measured temperature) and a temperature specified by the temperature profile. Further specifically, when the vehicle tank temperature becomes greater than the temperature, which is specified by the temperature profile, by a predetermined difference between the vehicle tank temperature and a predetermined threshold, the hydrogen station 1 may reduce the hydrogen charging pressure below a pressure value specified by the charging profile or may suspend charging of hydrogen. In this way, safety of hydrogen charging can be further enhanced.

The communication between the hydrogen station 1 and the vehicle 3 is not limited to an infrared communication and may be another communication using another medium such as a cable and an electric wave.

Summarizing the above embodiment, a fluid charging system is for a movable object having a tank, which is configured to be charged with fluid, and a supply facility, which is configured to charge fluid to the tank. The movable object is configured to store a charging profile, which specifies a charging pressure of fluid in each predetermined elapsed time point from beginning of charging of fluid to a tank of the movable object when fluid is charged. The movable object is further configured to transmit the charging profile to the supply facility. The supply facility is configured to receive the charging profile and configured to control the charging pressure according to the received charging profile when charging fluid to the movable object corresponding to the received charging profile.

As described above, the fluid charging system is configured to control the charging pressure according to the charging profile of the movable object when charging fluid to the movable object. Therefore, the charging pressure is appropriately controllable according to a characteristic of the tank of the movable object. Thus, the movable object can be efficiently and safely charged with fluid. The charging profile may be, for example, determined for each movable object, i.e., for each tank. For example, the charging profile may be an optimal charging profile, which is determined to reduce a time period required for charging fluid as much as possible, while satisfying a condition to maintain an in-tank temperature to be less than a predetermined temperature. The optimal charging profile is affected by the volume, the shape, the material, and the like of the tank and determined for each tank.

In the fluid charging system, the movable object may be further configured to detect an actual in-tank temperature and an actual in-tank pressure when fluid is charged to the tank. The movable object may be further configured to transmit the detected actual in-tank temperature and the detected actual in-tank pressure to the supply facility. The supply facility may be further configured to update the charging profile according to the detected actual in-tank temperature and the detected actual in-tank pressure received from the movable object. The supply facility may be further configured to transmit the updated charging profile to the movable object. In this way, the charging profile can be further appropriately set, and fluid can be further efficiently and safely charged. In addition, even when the shape, the volume, the material, and the like of the tank are changed due to aging, the charging profile can be updated adaptively to the tank. The charging profile may be updated within a range, such that the in-tank temperature does not exceed a predetermined upper limit, and a time period required for charging of hydrogen is further reduced.

The supply facility may have a data map, which specifies an updated content of the charging profile according to the actual in-tank temperature and the actual in-tank pressure and a pressure specified by the charging profile, for example. The updated content may include, for example, increasing or decreasing of the charging pressure by a predetermined amount in a certain period. The supply facility may determine the updated content of the charging profile by substituting the actual in-tank temperature and the actual in-tank pressure and the pressure specified by the charging profile into corresponding values of the data map. Thus, the charging profile can be updated according to the updated content. The movable object receives the updated charging profile transmitted from the supply facility. For example, a previous charging profile stored in a charging profile storage unit may be overwritten by the updated charging profile.

In the fluid charging system, the movable object may be further configured to store a temperature profile, which specifies the in-tank temperature in each predetermined elapsed time point from beginning of charging of fluid to the tank when fluid is charged. The movable object may be further configured to transmit the temperature profile to the supply facility. The supply facility may be configured to reduce the charging pressure below a pressure value specified by the charging profile according to a comparison result between the actual in-tank temperature and a temperature specified by the temperature profile. Further specifically, when the actual in-tank temperature becomes greater than the temperature, which is specified by the temperature profile, by a predetermined difference between the actual in-tank tank temperature and a predetermined threshold, the supply facility may reduce the hydrogen charging pressure below the pressure value specified by the charging profile or may suspend charging of hydrogen. In this way, the actual in-tank temperature can be restricted from excessively increasing, and thereby safety can be further enhanced.

The movable object may be, for example, a vehicle, a vessel, an airplane, and the like. The vehicle may be, for example, a passenger car, a track, a two-wheeled vehicle, a railway car, and the like.

A state of the fluid may be, for example, liquid or gas. The fluid may be various fuel. Specifically, the fluid may be, for example, hydrogen, gasoline, heavy oil, light oil, liquefied petroleum gas (LPG), alcohol such as ethanol, and the like.

The fluid charging system may include a charging profile transmission unit, a charging profile reception unit, a temperature and pressure transmission unit, a temperature and pressure reception unit, a temperature profile transmission unit, and a temperature profile reception unit, for exchanging various information between the movable object and the supply facility. For example, the fluid charging system may exchange information via an infrared communication, an electric wave communication, and the like. In particular, an infrared communication is advantageous, since directivity of an infrared ray is high and it is less possible to cause interference even when multiple movable objects exist close to the supply facility.

For example, an infrared communication may be performed in the following manner. The movable object may have a connection port communicating with the tank. The supply facility may supply fluid to the tank of the movable object through a feed pipe connectable with the connection port. The movable object may include a movable-object-side infrared communication device near the connection port. The supply facility may include a supply-facility-side infrared communication device at the feed pipe. The supply-facility-side infrared communication device is located in a position in the feed pipe such that, the supply-facility-side infrared communication device is communicable with the movable-object-side infrared communication device via an infrared communication when the feed pipe is connected to the connection port. Specifically, for example, the supply-facility-side infrared communication device is located in a position where an optic axis of the movable-object-side infrared communication device substantially coincides with an optic axis of the supply-facility-side infrared communication device when the feed pipe is connected to the connection port. In the present structure, the movable-object-side infrared communication device is communicable with the supply-facility-side infrared communication device via an infrared communication when the feed pipe is connected with the connection port.

The above processings such as calculations and determinations are not limited to be executed by the control system 7, the hydrogen charging control ECU 21, and the like. The control unit may have various structures including the control system 7, the hydrogen charging control ECU 21, and the like shown as an example.

The above processings such as calculations and determinations may be performed by any one or any combinations of software, an electric circuit, a mechanical device, and the like. The software may be stored in a storage medium, and may be transmitted via a transmission device such as a network device. The electric circuit may be an integrated circuit, and may be a discrete circuit such as a hardware logic configured with electric or electronic elements or the like. The elements producing the above processings may be discrete elements and may be partially or entirely integrated.

It should be appreciated that while the processes of the embodiments of the present invention have been described herein as including a specific sequence of steps, further alternative embodiments including various other sequences of these steps and/or additional steps not disclosed herein are intended to be within the steps of the present invention.

Various modifications and alternations may be diversely made to the above embodiments without departing from the spirit of the present invention.

What is claimed is:

1. A method for controlling fluid charge, the method comprising:

transmitting a target charging profile stored in a movable object from the movable object to a supply facility, the target charging profile being set according to a characteristic of the tank to specify a target charging pressure of fluid in each elapsed time point from a beginning of fluid charge when a tank of the movable object is charged with fluid from the supply facility;

receiving the target transmitted charging profile;

controlling charging pressure of fluid, in each elapsed time point, at the target charging pressure specified by the received charging profile, when fluid is charged to a specific movable object, which corresponds to the target charging profile;

detecting an actual in-tank temperature value and an actual in-tank pressure value of the tank during the charging of the fluid from the supply facility to the movable object;

transmitting the detected actual in-tank temperature value and the detected actual in-tank pressure value to the supply facility, determining whether or not the actual in-tank pressure value transmitted from the movable object is normal with respect to the target charging profile during the charging of the fluid to the movable object, wherein when it is determined that the actual in-tank pressure value is normal with respect to the target charging profile, the charging pressure control unit continues to charge the fluid to the movable object in accordance with the target charging profile, and when it is determined that the actual in-tank pressure value is abnormal with respect to the target charging profile, the charging pressure control unit charges the fluid to the movable object in accordance with the actual in-tank pressure value instead of the target charging profile;

determining, upon completion of the charging of the fluid to the movable object, that the charging of the fluid to the movable object has been completed not in accordance with the charging profile, when it is determined that the actual in-tank pressure value is abnormal with respect to the target charging profile;

updating contents of the target charging profile based on the actual in-tank pressure value in the charging of the fluid to the movable object, when it is determined that the charging of fluid to the movable object has been completed not in accordance with the charging profile;

transmitting the calculated updated contents of the target charging profile to the movable object; and updating the stored target charging profile in the movable object with the updated contents of the target charging profile.

2. The method according to claim 1, wherein the characteristic of the tank is at least one of a volume of the tank, a shape of the tank, a material of the tank.

3. The method according to claim 1, wherein the controlling includes:

controlling charging pressure of fluid, in each elapsed time point, at the target charging pressure specified by the received target charging profile, such that a temperature in the tank does not exceed a predetermined upper limit.

* * * * *